Patented Dec. 12, 1950

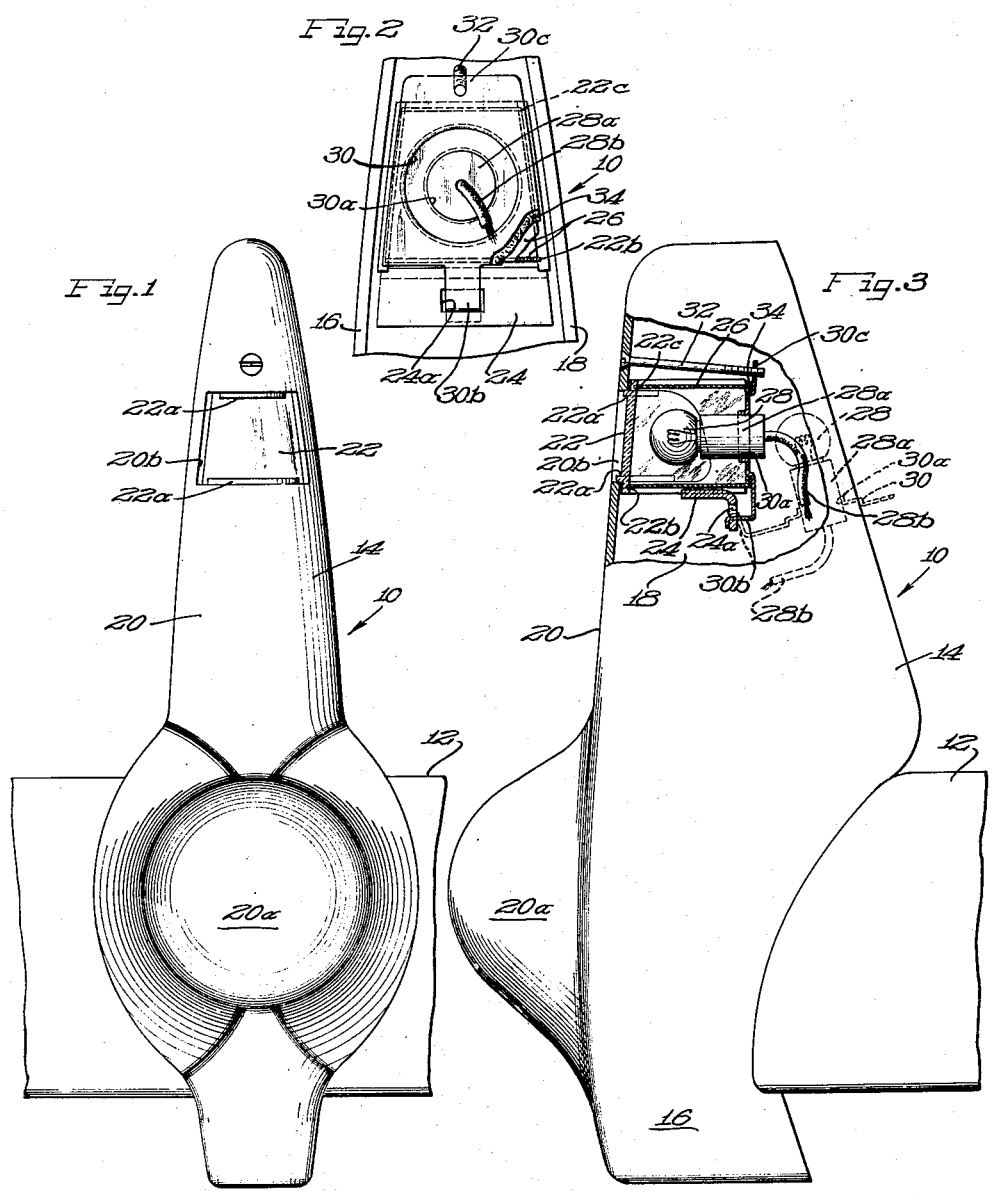

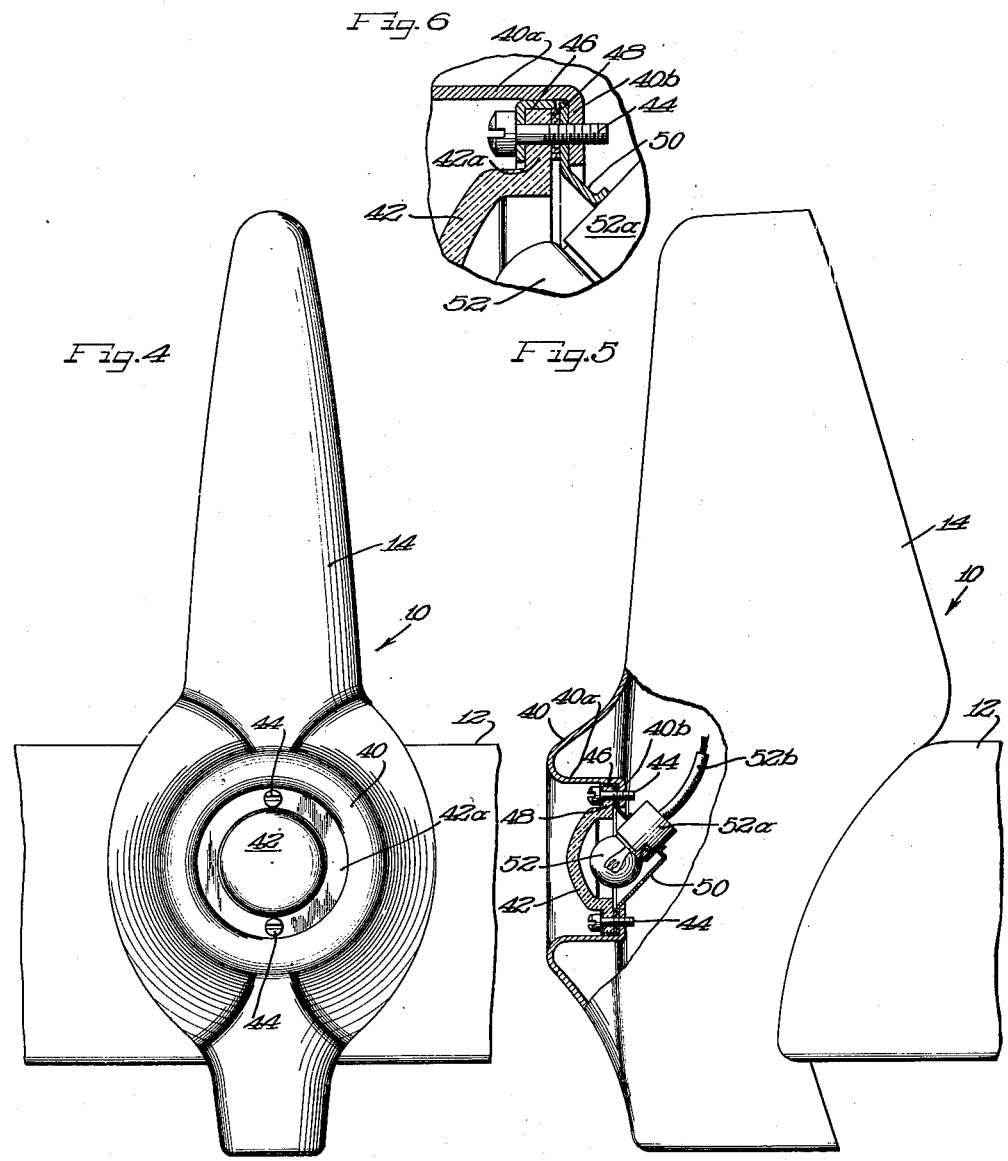

2,533,212

UNITED STATES PATENT OFFICE 2,533,212

COMBINED VEHICLE BUMPER GUARD AND SUPPORT STRUCTURE FOR TURN SIGNAL INDICATORS OR THE LIKE

James G. Balmer, Jr., Detroit, Mich., assignor to Houdaille-Hershey Corporation, Detroit, Mich., a corporation of Michigan Application April 2, 1949, Serial No. 85,070

12 Claims. (Cl. 177—329)

This invention relates to improvements in turn signal lights for automotive vehicles and more particularly concerns combined vehicle bumper guard and turn signal lights.

In practice, turn signal indicators of various types have been used to indicate a vehicle driver's intent to make a turn and have proved to be valuable in promoting traffic safety. The turn signal lights or indicators are placed generally at the lower part of the vehicle chassis in order to be readily visible to pedestrians and occupants of other automobiles. Ordinarily the turn signal lights are located in the fenders of the vehicle, but this is somewhat of a disadvantage, due to the difficulty of reaching the mechanism when in need of replacement or repair and such installations involve higher manufacturing costs.

It is, therefore, an important object of the present invention, to provide a turn signal light which may be readily assembled in a vehicle bumper guard.

Another object of the invention is to provide an improved bumper guard and turn signal mounting.

A further object of this invention is to provide an integral turn signal and bumper guard unit which may be economically manufactured and may be readily mounted on either the front or rear bumper of an automobile.

Other and further objects, features and advantages of the present invention will become apparent to those skilled in the art from the following detailed description of a preferred embodiment thereof, taken in conjunction with the accompanying drawings, in which:

Figure 1 is a front elevational view of a bumper guard and turn signal light, constructed in accordance with the teachings of the present invention, mounted on the bumper of an automobile;

Figure 2 is a fragmentary, rear elevational view showing the rear of the turn signal light unit on an enlarged scale as compared to Figure 1;

Figure 3 is a side elevational view, with parts broken away and in section showing the assembled turn signal light and bumper guard;

Figure 4 is a front elevational view of a bumper guard and turn indicator light unit, showing a modification of the turn signal feature;

Figure 5 is a side elevational view with parts broken away and in section to show the modified turn signal light in detail;

Figure 6 is an enlarged scale sectional view of details of the mounting of the light in the bumper guard as practiced in the modified structure.

In Figure 1 and the other views, the reference numeral 10 indicates generally a bumper guard and turn signal unit constructed in accordance with this invention, which is suitable for attaching to either a forward or rear automobile bumper 12. The unit 10 has a shell-like guard structure 14, being closed on all sides with the exception of the side which is adjacent the bumper 12.

The bumper guard 10 is elongated in the vertical direction and has the long, sweeping, symmetrically curved surfaces currently popular in the design of automobiles and their accessories. The shell 14 has side walls 16 and 18 which are integrally formed as by stamping from the same piece of metal stock and their front portions form a symmetrically curved front or shock wall 20. It will be noted with reference to Figures 1 and 3 that the portion of the shock wall 20 which is adjacent the bumper 12, is outwardly bulged to provide a reinforcing nose 20a which merges with the side walls 16 and 18 in keeping with the streamlining.

There is an aperture 20b in the upper portion of the shock wall 20 which provides a front opening for the turn indicator light. A substantially U-shaped lens 22, of plastic or similar material, is provided with an upper and lower bead 22a for properly positioning the U-shaped lens within the shock wall aperture 20b. A bracket member 24, having a substantially L-shaped cross-section is welded intermediate the side walls 16 and 18 adjacent and below the opening 20b in the shock wall 20 of the bumper guard 14. The bracket 24 has an elongated slot 24a therein, the slot being centrally located on the depending leg of the bracket.

The lens 22 is provided with a lower groove 22b and an upper groove 22c for accommodating a U-shaped stamped member 26, which when inserted within the grooves 22b and 22c closes the U of the plastic lens 22 to provide a closed chamber. The U-shaped member 26 has a generally circular aperture in the back or base of the U of sufficient size to admit a light bulb 28 which is mounted on a hinged mounting plate 30. The plate 30 has a central aperture defined by an inturned lip 30a which snugly receives the light bulb socket 28a. The plate 30 is hinged through the slot 24a and the bracket 24 by means of a flanged lower extremity 30b.

With attention directed to Figures 2 and 3 it can be seen that the plate 30 is swiveled at 30b about the slot 24a into an assembled position wherein the light bulb 28 is correctly disposed within the chamber defined by the lens 22 and the U-member 26, for illumination purposes. A screw 32 is inserted through the front wall 20 and threaded into an aperture 30c in the plate 30 to secure the plate 30 and bulb 28 in position for illumination. When the screw 32 is tightened, the plate 30 presses against the gasket 34 which is placed on the outer surface of the stamping 26 about the aperture in the back thereof.

When desired, for purposes of repair or replacement, the screw 32 need only be loosened to lower the plate 30, the socket 28a and the bulb 28 to a position for ready access from the rear of the bumper guard 14. The bulb socket 28a is attached by wires 28b to an appropriate "flasher" mechanism for imparting a flashing signal to the bulb or lamp 28 if such is desired. Electrical energy for illumination is of course supplied by the electrical system of the vehicle.

Figures 4, 5 and 6 illustrate a modification of the aforedescribed bumper guard and turn signal unit, the modification being accomplished by disposing the turn signal within the buttress nose of the aforedescribed bumper guard 14.

The modified guard structure has a buttress nose 40 which has an integrally formed, inwardly turned flange 40a, which carries a radially inwardly projecting portion 40b thereon. A plastic lens 42 of generally semi-spherical configuration is provided with a radially outwardly directed flange 42a which is secured to the flange 40b as by cap screws 44. An annular clamping member 46 of substantially L-shaped cross section is provided to be inserted about the outer the outer periphery of the lens flange 42a and is provided with suitable apertures to receive the cap screws 44 therethrough. A gasket 48 is provided on the under side of the lens 42 as is a bulb or lamp mounting plate 50. The cap screw 44 is threaded into the flange 40b.

The plate 50 is of a configuration suitable to hold the lamp 52 by a lamp socket 52a with the wires 52b protruding upwardly to give access for repair and replacement. It is to be noted that further access to the mechanism is easily attained by removing the screws 44 and lens 42. It is to be also noted that the buttress nose 40 provides a protective ring for the lens and lamp as well as providing a buttress wall for the bumper guard 14.

It will be understood that other and various modifications may be had through a wide range without departing from the principles of the present invention, and it is, therefore, not the purpose to limit the patent granted hereon otherwise than necessitated by the scope of the claims thereof.

I claim as my invention:

1. A vertically arranged guard structure for attachment to a vehicle bumper, comprising a shell defining an open hollow chamber, means on said shell providing a projecting buttress, means on said shell defining a lens opening rearwardly of said buttress, a lens secured to said shell in register with said opening, and a light bulb supporting structure disposed in said shell cooperating with said lens to provide a closed light bulb chamber for a light bulb carried by said structure.

2. A vertically arranged guard structure for attachment to a vehicle bumper, comprising a shell defining an open hollow chamber, means on said shell providing a projecting buttress, means on said shell defining a lens opening rearwardly of said buttress, a lens secured to said shell in register with said opening, and a light bulb supporting structure disposed in said shell cooperating with said lens to provide a closed light bulb chamber for a light bulb carried by said structure, said structure including a sheet metal plate having its margin disposed in substantially dirt-tight cooperation with the margin of the lens.

3. A vertically arranged guard structure for attachment to a vehicle bumper, comprising a shell defining an open hollow chamber, means on said shell providing a projecting buttress, means on said shell defining a lens opening rearwardly of said buttress, a lens secured to said shell in register with said opening, a light bulb supporting structure disposed in said shell cooperating with said lens to provide a closed light bulb chamber for a light bulb carried by said structure, and a second structure secured detachably to the shell and clamping said lens and bulb supporting structure in unitary assembly with the shell.

4. A guard structure as defined in claim 3 wherein said second structure comprises a transverse bar secured to the shell below the bulb supporting structure and a hinge plate secured to said transverse bar and a screw connecting the hinge plate to the shell.

5. A guard structure as defined in claim 3 wherein said second structure comprises a clamping annulus and screws securing said annulus to the shell and clamping the lens and plate to the shell.

6. A vertically arranged bumper guard structure comprising a shell having a forwardly projecting buttress nose, means on said shell defining a lens opening, a lens secured to said shell in register with said opening, a mounting plate secured to said shell, and an illuminating unit detachably mounted on said plate in register with said lens and said opening.

7. A vertically arranged guard structure for attachment to a vehicle bumper, comprising a shell defining a hollow open chamber, means on said shell providing a projecting buttress, means on said shell defining a front lens opening, a lens secured to said shell in register with said opening and disposed in protected relation inwardly from the buttress projection, a mounting bracket secured to said shell inwardly of said opening, and a lamp holder unit mounted on said bracket so as to be disposed in the rear of said lens in register with said opening.

8. A vehicle bumper guard unit having walls defining an elongated open hollow shell, means on said shell defining a buttress nose, means on said shell defining a lens opening rearwardly of said nose, a mounting bracket secured intermediate the side walls of said shell, a lamp mounting plate hinged to said bracket, a lamp mounted on said plate, and means for detachably securing said plate to said shell so as to dispose said lamp in register with said lens and said opening.

9. A vehicle bumper guard unit having side walls and a buttress wall defining an elongated open hollow shell, means on said buttress wall defining a buttress nose, means on said shell defining a lens opening, a U-shaped lens disposed in said shell in register with said opening and conforming to said side walls and said buttress wall, a mounting bracket secured intermediate said side walls, a closure member disposed in said shell for closing the U in said lens, means on said member defining a lamp opening, a lamp mounting plate detachably hinged to said bracket, a lamp mounted on said bracket and means for detachably securing said plate to said shell whereby said lamp is in register with said lens.

10. A bumper guard of the type suitable for mounting on a vehicle bumper as an accessory, comprising side walls and a buttress wall defining an elongated open hollow shell, means on said buttress wall defining a buttress nose, means on said buttress wall defining a lens opening, a U-shaped lens disposed in said shell, said lens being constructed and arranged to conform substantially to said side walls and said buttress wall, means defining a housing for closing said lens, said housing defining a lamp opening in register with said lens, a mounting bracket secured intermediate said side walls, a lamp hinge rotatably secured to said bracket, a lamp mounted on said hinge, and means for detachably securing said hinge to said shell so as to maintain said lamp in register with said lens and said lens opening.

11. A vehicle bumper guard unit, comprising side walls and an integrally formed buttress wall defining an elongated open hollow shell, means on said buttress wall defining a projecting buttress, means on said shell defining a lens aperture, a lens secured to said shell rearwardly of said projection and in register with said opening, a mounting plate internally detachably secured to said shell adjacent said opening, and an illuminating unit secured to said mounting plate.

12. A vehicle bumper guard unit, comprising side walls and an integrally formed buttress wall defining an elongated open hollow shell, means on said buttress wall defining a buttress nose having an annular inwardly turned lip portion, means on said lip defining a lens opening, a lens detachably secured to said nose wholly within said lip, a mounting plate detachably secured to said lens and said shell, and a lamp unit secured to said plate in register with said lens and said opening.

JAMES G. BALMER, Jr.

REFERENCES CITED

The following references are of record in the file of this patent:

UNITED STATES PATENTS

| Number | Name | Date |
| --- | --- | --- |
| 1,337,872 | Zahnow | Apr. 20, 1921 |
| 1,384,249 | Frank | July 12, 1921 |